(12) United States Patent
Lee et al.

(10) Patent No.: US 9,321,688 B2
(45) Date of Patent: Apr. 26, 2016

(54) METHOD FOR PREPARING POLYCRYSTALLINE ALUMINUM OXYNITRIDE HAVING ENHANCED TRANSPARENCY

(75) Inventors: Jae Hyung Lee, Busan (KR); Ji Hye Kim, Daegu (KR); Bo Hoon Han, Daegu (KR); In Chul Jung, Busan (KR)

(73) Assignee: INDUSTRY-ACADEMIC COOPERATION FOUNDATION, YEUNGNAM UNIVERSITY, Gyeongsangbuk-Do (KR)

(*) Notice: Subject to any disclaimer, the term of this patent is extended or adjusted under 35 U.S.C. 154(b) by 22 days.

(21) Appl. No.: 14/001,873

(22) PCT Filed: Feb. 28, 2012

(86) PCT No.: PCT/KR2012/001483
§ 371 (c)(1),
(2), (4) Date: Aug. 28, 2013

(87) PCT Pub. No.: WO2012/118315
PCT Pub. Date: Sep. 7, 2012

(65) Prior Publication Data
US 2013/0337993 A1 Dec. 19, 2013

(30) Foreign Application Priority Data
Feb. 28, 2011 (KR) ........................ 10-2011-0017858

(51) Int. Cl.
C04B 35/10 (2006.01)
C04B 35/581 (2006.01)
C04B 35/626 (2006.01)

(52) U.S. Cl.
CPC ............... *C04B 35/10* (2013.01); *C04B 35/581* (2013.01); *C04B 35/6261* (2013.01); *C04B 2235/3206* (2013.01); *C04B 2235/3217* (2013.01);
(Continued)

(58) Field of Classification Search
CPC .................... C04B 35/581; C04B 2235/3865; C04B 2235/3869
See application file for complete search history.

(56) References Cited

U.S. PATENT DOCUMENTS 4,241,000 A 12/1980 McCauley et al.
4,250,116 A 2/1981 Bartley
(Continued)

FOREIGN PATENT DOCUMENTS

JP 1991-215364 A 9/1991
JP 2005-170703 A 9/1991
(Continued)

OTHER PUBLICATIONS

Machine Translation of JP 2005-170703.*
(Continued)

*Primary Examiner* — Russell Kemmerle, III
(74) *Attorney, Agent, or Firm* — Revolution IP, PLLC

(57) ABSTRACT

Disclosed is a method for preparing polycrystalline aluminum oxynitride having enhanced transparency, and preparing polycrystalline aluminum oxynitride by sintering a powder mixture of $Al_2O_3$ and AlN under atmospheric pressure, wherein the content of AlN is set to 17 to 26 mol %, a first sintering is performed at 1,575° C. to 1,675° C. so as to enable raw-material powders to have a relative density of 95% or higher, and a second sintering is performed so as to enable the raw-material powders to have a higher relative density.

7 Claims, 14 Drawing Sheets

| X | 2.0 | 2.25 | 2.5 | 3.0 | 3.5 | 4.0 | 4.5 | 5.0 |
|---|---|---|---|---|---|---|---|---|
| w/o 1st Sintering 1970℃/2 h | | | | | | | | |
| w/ 1st Sintering 1660℃/10 h 1970℃/2 h | | | | | | | | |

(52) U.S. Cl.
CPC . *C04B2235/3225* (2013.01); *C04B 2235/3227* (2013.01); *C04B 2235/3865* (2013.01); *C04B 2235/656* (2013.01); *C04B 2235/6562* (2013.01); *C04B 2235/6565* (2013.01); *C04B 2235/6567* (2013.01); *C04B 2235/661* (2013.01); *C04B 2235/762* (2013.01); *C04B 2235/77* (2013.01); *C04B 2235/78* (2013.01); *C04B 2235/80* (2013.01); *C04B 2235/81* (2013.01); *C04B 2235/85* (2013.01); *C04B 2235/96* (2013.01); *C04B 2235/9653* (2013.01)

(56) References Cited

U.S. PATENT DOCUMENTS

| | | | |
|---|---|---|---|
| 4,481,300 A | | 11/1984 | Hartnett et al. |
| 4,686,070 A | | 8/1987 | Maguire et al. |
| 4,720,362 A | * | 1/1988 | Gentilman et al. .......... 264/1.21 |
| 5,231,062 A | | 7/1993 | Mathers et al. |
| 5,646,078 A | * | 7/1997 | Mohri et al. .................. 501/98.4 |
| 5,688,730 A | | 11/1997 | Bachelard et al. |
| 6,955,798 B2 | | 10/2005 | Miao |
| 7,045,091 B1 | | 5/2006 | Patel et al. |
| 7,163,656 B1 | | 1/2007 | Gilde et al. |
| 7,459,122 B2 | * | 12/2008 | Chu et al. ...................... 264/604 |
| 2007/0087203 A1 | * | 4/2007 | Bayya et al. ................... 428/432 |
| 2008/0187721 A1 | * | 8/2008 | Engl .............................. 428/172 |
| 2010/0167907 A1 | | 7/2010 | Lee et al. |

FOREIGN PATENT DOCUMENTS

| | | | |
|---|---|---|---|
| JP | 2003-054920 A | | 2/2003 |
| JP | 2005170703 | * | 6/2005 |
| WO | WO 2008-047955 A1 | | 4/2008 |

OTHER PUBLICATIONS

International Search Report of PCT/KR2012/001483 mailed on Sep. 28, 2012 from ISA/KR.

* cited by examiner

METHOD FOR PREPARING POLYCRYSTALLINE ALUMINUM OXYNITRIDE HAVING ENHANCED TRANSPARENCY

CROSS REFERENCE TO PRIOR APPLICATIONS

This application is a National Stage Application of PCT International Patent Application No. PCT/KR2012/001483 filed on Feb. 28, 2012, under 35 U.S.C. §371, which claims priority to Korean Patent Application No. 10-2011-0017858 filed on Feb. 28, 2011, which are all hereby incorporated by reference in their entirety.

TECHNICAL FIELD

The present invention relates to a method for preparing aluminum oxynitride (AlON), and more particularly, to a method for preparing polycrystalline AlON having enhanced transparency.

BACKGROUND ART

Polycrystalline ceramic is generally opaque since a light is scattered due to pores, grain boundaries, or impurities. However, when such causes for light scattering are removed, the polycrystalline ceramic may become transparent like a single crystal. According to light-transmissive alumina that is best-known, alumina is capable of transmitting a light by removing most pores by performing atmosphere-sintering using high purity powders and removing grain boundaries by increasing sizes of crystal grains. However, since crystals have anisotropic hexagonal shapes, a light transmittance is affected by directions of the crystal grains, and thus the alumina becomes light-transmissive, instead of transparent like glass.

Aluminum oxynitride ($Al_{23}O_{27}N_5$) is commonly denoted by "AlON", and in detail, γ-AlON has an isotropic cubic shape and is a distinctive material that may become transparent since pores are relatively easily removed due to satisfactory sinterability. However, when AlON is applied to a high intensity wear-resistant transparent window instead of transparent tempered glass or sapphire, the value of AlON may increase when AlON has very a high light transmittance close to about 85% that is a light transmittance of sapphire. Accordingly, pores of AlON ceramic, which are biggest causes for reducing a transmittance, are removed as much as possible, thereby easing the reduction of the transmittance caused by a thick thickness. In relation to such a material, U.S. Pat. No. 4,241,000 first disclosed a method for preparing polycrystalline AlON having a light transmittance by mixing $Al_2O_3$ powder and AlN powder, thermally treating the powder mixture under a nitrogen gas atmosphere for 24 hours at 1200° C., and then sintering the thermally treated powder mixture at 1800° C. under an atmospheric pressure.

Also, according to U.S. Pat. No. 4,520,116, a polycrystalline whose relative density is equal to or higher than 99% and a visible-light transmittance of a specimen having a thickness of 1.78 mm is 43% is prepared by calcining AlN and $Al_2O_3$ powders to synthesize AlON powder, and then adding a small amount of a boron (B) compound, an yttrium (Y) compound, or a lanthanum (La) compound as a sintering aid to the AlON powder.

Also, U.S. Pat. No. 4,481,300 and U.S. Pat. No. 4,686,070 disclose a method for preparing AlON having an infrared-light transmittance of 80% at a thickness of 1.45 mm by mixing $Al_2O_3$ powder and carbon black powder in a suitable ratio and calcining the mixture at a temperature around 1600° C. to prepare $Al_2O_3$ and AlN, thermally treating $Al_2O_3$ and AlN at a temperature around 1800° C. in a boron nitride (BN) container to synthesize AlON, ball-milling AlON for a long period of time to prepare minute AlON powder, molding the minute AlON powder, and then sintering the molded AlON powder under a nitrogen gas atmosphere and atmospheric pressure for 24 to 48 hours at a temperature from 1900° C. to 2140° C., wherein a Y compound and a La compound is added as a sintering accelerator.

Also, U.S. Pat. No. 4,720,362 discloses a preparing process of adding about 0.5 wt % of a B compound or a Y compound to AlON powder, molding the AlON powder, and then sintering the molded AlON powder for 20 to 100 hours at a temperature equal to or higher than 1900° C. Here, $B_2O_3$ that is the B compound or $Y_2O_3$ that is the Y compound, which is added as a sintering additive, forms a liquid phase during sintering to accelerate densification during the beginning and middle of the sintering and to prevent growth of abnormal crystal grains as a secondary phase solute-dragged or precipitated pins grain boundaries during the end of the sintering. Accordingly, pores are prevented from being no longer removed as the pores enter crystal grains.

Also, U.S. Pat. No. 5,231,062 discloses a method for preparing transparent aluminum magnesium oxynitride (AlMgON) by adding 2.0 to 16 wtT of MgO.

Also, U.S. Pat. No. 5,688,730 discloses a method for preparing AlON powder by mixing $Al_2O_3$ and AlN powders having a relatively high specific surface area.

Also, U.S. Pat. No. 6,955,798 discloses a method for preparing AlON powder by thermally treating a mixture of Al and AlO powders under a nitrogen gas atmosphere to prepare a nitrated mixture of Al and AlO, milling the nitrated mixture, and then re-thermally treating the milled nitrated mixture at a sufficiently high temperature.

Also, U.S. Pat. No. 7,045,091 discloses a method for preparing transparent AlON, wherein, instead of first synthesizing AlON powder and then sintering the AlON powder generally performed to prepare transparent AlON, a powder mixture of $Al_2O_3$ and AlN is sintered with a help of a liquid phase at a temperature from 1950° C. to 2025° C. in which the liquid phase and a solid phase coexist, and then the powder mixture is re-sintered to change the liquid phase to the solid phase at a temperature that is lower than 1950° C. to 2025° C. by at least 50° C., in which only the solid phase exists. However, a visible-light transmittance of the transparent AlON prepared as such and having a thickness of 1 mm only exceeds 10%.

Also, U.S. Pat. No. 7,163,656 discloses a method for preparing high density AlON regardless of transparency, via uniaxial hot pressing. The uniaxial hot pressing is used to obtain theoretical high density or to sinter a material that is difficult to be densified due to low sinterability. However, since the uniaxial hot pressing is uniaxial pressing, a shape after sintering is largely limited, productivity is low, and costs are high. Also, since a graphite mold is used for pressing, a color of the AlON becomes generally black, and thus it is difficult to prepare a transparent product.

AlON starts to evaporate at a temperature equal to or higher than 1950° C. Evaporation during high temperature sintering may be reduced if possible, and AlON is easily suppressed from being evaporated even at a low nitrogen gas pressure from 0.1 MPa to 0.3 MPa. Here, an overpressure of 1 atm to 3 atm is applied to a nitrogen gas via electricity during a general atmospheric pressure sintering under a flowing nitrogen gas atmosphere, and thus costs are barely increased. Alternatively, a special pressure electric furnace may be used to remarkably increase a gas pressure up to about 10 MPa, and a gas pressure sintering (GPS) furnace may be used during GPS, but costs are increased and productivity is decreased. The GPS is developed to further increase sintering density by suppressing silicon nitride from evaporating during high temperature sintering and increasing sintering power by using a gas pressure, and may be used to prepare AlON, but product sizes are limited and costs are remarkably increased. Furthermore, hot isostatic pressing (HIP) for applying a gas pressure around 200 MPa may be used, but a size of a high pressure chamber is further decreased and costs are further increased.

Since most AlON ceramics prepared via such general technologies above are prepared by mixing a suitable amount of carbon powder with $Al_2O_3$ or by thermally treating AlN and $Al_2O_3$ powders at a high temperature to separately synthesize AlON powder, costs are increased. Also, since sintering is performed at a temperature equal to or higher than 2000° C., or is performed at a temperature lower than 2000° C. for a long period of time in order to increase transparency, costs are further increased. On the other hand, it is difficult for AlON ceramic that is prepared by sintering $Al_2O_3$ and AlN powders under an atmospheric pressure to have high transparency.

Meanwhile, WO 2008-047955 filed by the present inventors discloses a method for preparing AlON by sintering $Al_2O_3$ and AlN powders, wherein 0.1 to 0.2 wt % of MgO is added as a sintering aid, as well as a well-known sintering aid, under a condition where the content of AlN is fixed to 35 mol %, and transparent AlON whose visible-light transmittance reaches 80% in a specimen having a thickness of 1.9 mm is prepared by performing presintering at a temperature of 1650° C. and then performing final sintering. However, here, the final sintering is performed for 5 hours at a relatively high temperature of 2000° C., and despite of such final sintering, the visible-light transmittance of the specimen having the thickness of 1.9 mm does not exceed 80%. Accordingly, a new method for preparing AlON having a largely enhanced transmittance despite of a low final sintering temperature from 1950° C. to 1970° C. is required.

A chemical formula of AlON is generally $Al_{23}O_{27}N_5$, or may be $Al_{(64+x)/3}O_{(32-x)}N_x$ based on nonstoichiometric determination capable of having a relatively large range of N, wherein AlON is in a single phase even when the number of N is higher than or smaller than 5.

However, in the above general technologies, a visible-light transmittance according to a ratio of $Al_2O_3$ and AlN powders, i.e., an effect of an "x" value in $Al_{(64+x)/3}O_{(32-x)}N_x$ on a visible-light transmittance, is not studied with respect to preparing transparent AlON by sintering AlON powder after synthesizing the AlON powder as a separate process or by sintering a powder mixture of $Al_2O_3$ and AlN powders.

The general technologies assume that 27 to 40 mol %, i.e., the "x" value of 3.4 to 6.0, is suitable, and in all academic researches, AlON is prepared or studied by fixing the content of AlN to 35.7 mol %, i.e, the "x" value to 5.0, in the general chemical formula of $Al_{23}O_{27}N_5$, or fixing the content of AlN to 30 mol %, i.e., the "x" value to 3.9.

Also, according to the paper "AlON: A Brief History of Its Emergence and Evolution" presented in Journal of the European Ceramic Society 29 (2009), the "x" value of AlON ceramic is 4.0, i.e., AlN is 31 mol %, in Surmet Corporation, U.S., that solely successfully commercialized transparent AlON worldwide. According to the paper, AlON powder is synthesized and sintered, and in order to obtain high transparency, AlON is prepared to have an average size of crystal grains from 200 to 250 µm. In order to obtain such a large size of crystal grains, sintering may be performed for a long time at a relatively high sintering temperature. Generally, crystal grains having a large size cause deterioration of strength of ceramic.

Accordingly, the present inventors suitably adjusted a molar fraction of $Al_2O_3$ and AlN, which are raw-material powders, while preparing AlON prepared via sintering, so as to increase sinterability, thereby further enhancing a light transmittance of AlON. In detail, generally, when sinterability of ceramic is increased, the same density may be obtained in a short time at a lower final sintering temperature.

DETAILED DESCRIPTION OF THE INVENTION

Technical Problem

The present invention provides a method for preparing transparent aluminum oxynitride (AlON) ceramic by further removing pores of AlON ceramic.

Technical Solution

According to an aspect of the present invention, there is provided a method for preparing transparent polycrystalline aluminum oxynitride (AlON), wherein a powder mixture of aluminum oxide ($Al_2O_3$) and aluminum nitride (AlN) is sintered under an atmospheric pressure, the method including: performing first sintering at a temperature from 1575° C. to 1675° C. such that a relative density is equal to or higher than 95% and the content of pure AlN is in a range from 17 to 26 mol %; and performing second sintering at a temperature from 1900° C. to 2050° C. such that a relative density higher than that in the first sintering is obtained, wherein a visible-light transmittance of a specimen having a thickness of 1.5 mm, which is obtained by the second sintering, is equal to or higher than 70%. Here, according to the content of the pure AlN, x may be 1.9 to 3.3 in $Al_{(64+x)/3}O_{(32-x)}N_x$, and in detail, the content of the pure AlN may be 21 to 23 mol %.

Here, when the content of the pure AlN is less than 17 mol %, a transmittance of the transparent polycrystalline AlON may be remarkably reduced due to a massive amount of secondary phases, and when the content of the pure AlN is more than 26 mol %, sinterability that is a function between a sintering temperature and a time starts to decrease, and thus the transmittance may be remarkably decreased.

A sintering additive used in the method may include at least one selected from 0.02 to 0.5 wt % of yttrium oxide ($Y_2O_3$), 0.02 to 0.5 wt % of lanthanum oxide ($La_2O_3$), yttrium (Y) compound corresponding to 0.02 to 0.5 wt % of $Y_2O_3$ or lanthanum (La) compound corresponding to 0.02 to 0.5 wt % of $La_2O_3$. The Y compound may be YO, and the La compound may be LaO. Here, when the content of the sintering additive is outside the above range, an amount of liquid phases formed by the sintering additive is excessive, and thus the liquid phases may not be completely evaporated after sintering. When the liquid phases remain in a specimen, the transmittance may be decreased.

The sintering additive may further include 0.06 to 0.29 wt % of magnesium oxide (MgO) or magnesium (Mg) compound corresponding to 0.06 to 0.29 wt % of MgO. The Mg compound may be MgO. Here, when the content of the sintering additive is outside the above range, a transmittance of a finally sintered specimen may be low in a visible light.

The method may include: performing the first sintering at a temperature from 1575° C. to 1675° C. such that the relative density is equal to or higher than 95%; and performing the second sintering at a temperature equal to or higher than 1925° C., in detail, from 1900° C. to 2050° C., such that the relative density higher than that in the first sintering is obtained.

In detail, the method may include: performing the first sintering for 10 hours at a temperature of 1650° C. such that the relative density is equal to or higher than 95%; and performing the second sintering at a temperature of 1970° C. such that the relative density higher than that in the first sintering is obtained.

Herein, relative density denotes a ratio of a relative value of relative density with respect to theoretical density, and porosity is obtained by subtracting relative density from 100. Relative density may be measured via an immersion method using an Archemedes' principle.

The first sintering and second sintering may be performed in an overpressure of 0.1 to 10 MPa, in detail, 0.1 to 0.3 MPa, by using a nitrogen gas pressure. Accordingly, AlON may be suppressed from being evaporated during the first sintering and the second sintering.

In the transparent polycrystalline AlON prepared as such, the content of the pure AlN is 17 to 26 mol %, a visible-light in-line transmittance is equal to or higher than 70%, in detail, 80%. When the content of the pure AlN is 17 to 21 mol %, the visible-light in-line transmittance is equal to or higher than 75%, a small amount of a φ'-AlON phase exists in a γ-AlON phase, and Vickers hardness is equal to or higher than 16.5 GPa.

According to another aspect of the present invention, there is provided a method for preparing transparent polycrystalline aluminum oxynitride (AlON), comprising synthesizing AlON powder and then sintering, wherein x is from 1.9 to 3.3 in $Al_{(64+x)/3}O_{(32-x)}N_x$ representing a composition of the AlON powder, and at least one selected from 0.02 to 0.5 wt % of yttrium oxide ($Y_2O_3$), 0.02 to 0.5 wt % of lanthanum oxide ($La_2O_3$), yttrium (Y) compound corresponding to 0.02 to 0.5 wt % of $Y_2O_3$, or lanthanum (La) compound corresponding to 0.02 to 0.5 wt % of $La_2O_3$, and at least one selected from 0.06 to 0.29 wt % of magnesium oxide (MgO) or magnesium (Mg) compound corresponding to 0.06 to 0.29 wt % of MgO are added as sintering additives.

When both high transparency and high hardness are desired, x may be from 1.9 to 2.4, a small amount of a φ'-AlON phase may exist in a γ-AlON phase, and Vickers hardness may be equal to or higher than 16.5 GPa.

Hereinafter, one or more embodiments of the present invention will be described in detail.

According to an embodiment of the present invention, in order to prepare transparent polycrystalline AlON ceramic, amounts of nitrogen and oxygen of AlON to be sintered, i.e., a mole ratio of $Al_2O_3$ powder and AlN powder that are to be mixed, are optimized, and a sintering additive is added to AlON before performing presintering and then final sintering.

Here, the mole ratio of the AlN powder and the $Al_2O_3$ powder is determined such that AlN is from 17 to 26 mol %, and thus $Al_2O_3$ is from 74 to 83 mol %, and in detail, AlN is from 21 to 23 mol % so as to increase transparency.

First sintering is performed on the AlON at a temperature of about 1650° C., and then second sintering is performed on the AlON at a temperature equal to or higher than 1900° C. When pores are not removed as much as possible during the first sintering, transparency may be decreased. When a temperature of a sintering furnace is increased to a final sintering temperature equal to or higher than 1900° C. without the first sintering, $Al_2O_3$ and AlN react with each other and change to AlON at a temperature around 1675° C. At this time, sinterability of AlON is relatively low, and since particles and pores of the AlON prepared without the first sintering are large, it is difficult to obtain high density by removing pores during final sintering. Generally, it is difficult to remove the pores when the particles and pores are large, i.e., densification is difficult.

Accordingly, the powder mixture of $Al_2O_3$ and AlN is densified as much as possible before the powder mixture is changed to AlON. Generally, $Al_2O_3$ starts to densify at a temperature of about 1500° C., and AlN starts to density at a temperature equal to or higher than about 1700° C. when several wt % of sintering additive exists. Accordingly, the powder mixture is easily densified when the content of $Al_2O_3$ whose sintering temperature is low is high. Thus, in order to prepare transparent high density AlON without pores via sintering, the first sintering is performed at a relatively low temperature, and the content of $Al_2O_3$ whose sinterability is high may be high, i.e., the content of AlN may be high during the first sintering. However, when a secondary phase is precipitated during the second sintering due to the low content of AlN, the transparency may be low.

Also, the AlON has an inverse spinel structure, and may be represented by a chemical formula of $Al_{(64+x)/3}\square_{(8-x)/3}O_{(32-x)}N_x$. Here, a square ($\square$) denotes a vacancy of an Al ion, which varies according to an x value that is an amount of nitrogen. According to the chemical formula, when the amount of nitrogen, i.e., the x value, is decreased, concentration of the vacancy is increased. Generally, when the vacancy increases in a crystal, a diffusion speed of atoms or ions is increased, and thus sinterability may be increased. Thus, when the ratio of AlN to $Al_2O_3$, i.e., the x value, is decreased in a γ-AlON phase, the concentration of vacancy in Al is increased, and thus sinterability is further increased and the pores may be easily removed.

According to the present invention, the sinterability of the AlON phase is further increased as the x value is decreased, and thus AlON may be further densified during the second sintering. In addition, such a small x value increases the content of $Al_2O_3$ whose sinterability is high, thereby accelerating densification during the first sintering and quickly removing the pores. Thus, the relative density is increased and almost all pores are removed during the second sintering. As a result, a very high light transmittance is obtained by reducing the x value as much as possible.

Advantageous Effects

As described above, cubic polycrystalline aluminum oxynitride (AlON) ceramic whose visible-light in-line transmittance is equal to or higher than 80% may be provided by removing almost all pores therein. In detail, since such transparent polycrystalline AlON ceramic has high intensity, high hardness, and high wear-resistance, it may be used in a product that requires high intensity, high hardness, and high wear-resistance, such as a transparent armor plate, a window of an infrared ray sensor, a radar dome, a transparent watch window, or a transparent display window. Also, a method of preparing a transparent AlON ceramic may be simplified and may be performed at a low cost since highly transparent AlON ceramic may be prepared at a relatively low sintering temperature and in a relatively short sintering time even when $Al_2O_3$ powder and AlN powder are mixed and sintered as they are without having to synthesize and sinter AlON powder.

MODE OF THE INVENTION

Hereinafter, the present invention will be described in greater detail with reference to the following examples for preparing aluminum oxynitride ceramic by variously changing process conditions. The following examples are for illustrative purposes only and are not intended to limit the scope of the invention.

Example 1

Aluminum oxynitride (AlON) was prepared by fixing yttrium oxide ($Y_2O_3$) and magnesium oxide (MgO) that are used as sintering additives respectively to 0.08 wt % and 0.15 wt % while varying a mole ratio of aluminum nitride (AlN) from 18.2% (x=2.0) to 35.7% (x=5.0). The actual content of aluminum oxide ($Al_2O_3$) and AlN that are two main materials were calculated based on an x value while considering the content of oxygen (about 1 wt %) contained in AlN powder due to surface oxidation and an abrasion loss of a $Al_2O_3$ ball during a ball-milling process. Such raw-material powders and sintering additives were milled in a polyurethane container for 48 hours by using a high purity $Al_2O_3$ ball by using ethylalcohol as a solvent, and then were dried by using a rotary evaporator drier. The dried powders were molded into a disk having a diameter of 20 mm and a thickness of 3 mm by using a dry uniaxial press, and then were cold isostatic pressed at 275 MPa. A specimen of the disk was sintered under a nitrogen atmosphere of 1 atm in a high temperature electric furnace, wherein first sintering was performed at 1660° C. for 10 hours and second sintering was performed at 1970° C. for 2 hours. A temperature was increased by 20° C. per minute up to 1500° C., and by 10° C. per minute afterwards, and was decreased by 20° C. per minute. The specimen upon which the second sintering is performed was grinded to have two flat surfaces, and then was surface-polished by using a diamond paste having a size of 3 μm by using a test surface polisher. A thickness of a final specimen was about 1.5 mm. An in-line transmittance of the specimen was measured within a wavelength range from 200 to 2500 nm by using a Varian Spectrophotometer (Carry 500).

Figure 1:
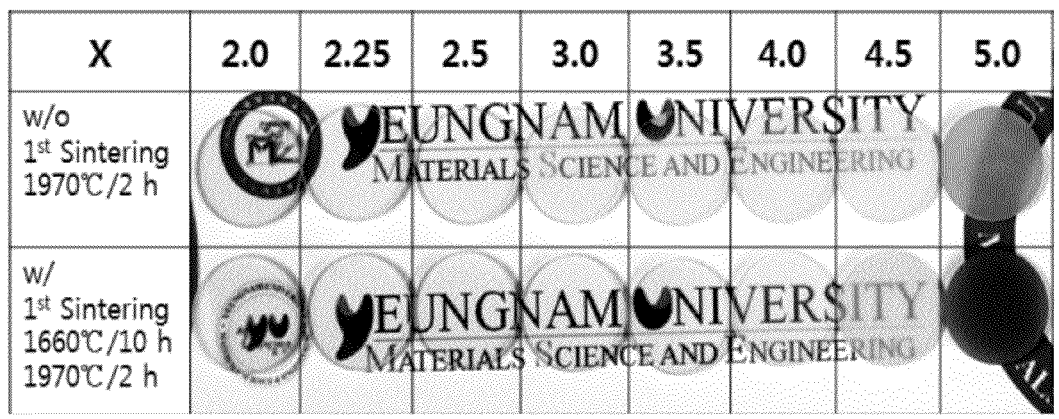
FIG. 1 is a table of photographs for comparing transparencies of aluminum oxynitride (AlON) ceramic specimens on which second sintering is performed without first sintering and of AlON ceramic specimens on which first sintering and second sintering are performed.

FIG. 1 is a table of photographs for comparing transparencies of AlON ceramic specimens on which second sintering is performed without first sintering and of AlON ceramic specimens on which first sintering and second sintering are performed, according to x values. Here, when the first sintering is not performed, in detail, when an x value is high, transparency was definitely low.

Figure 2:
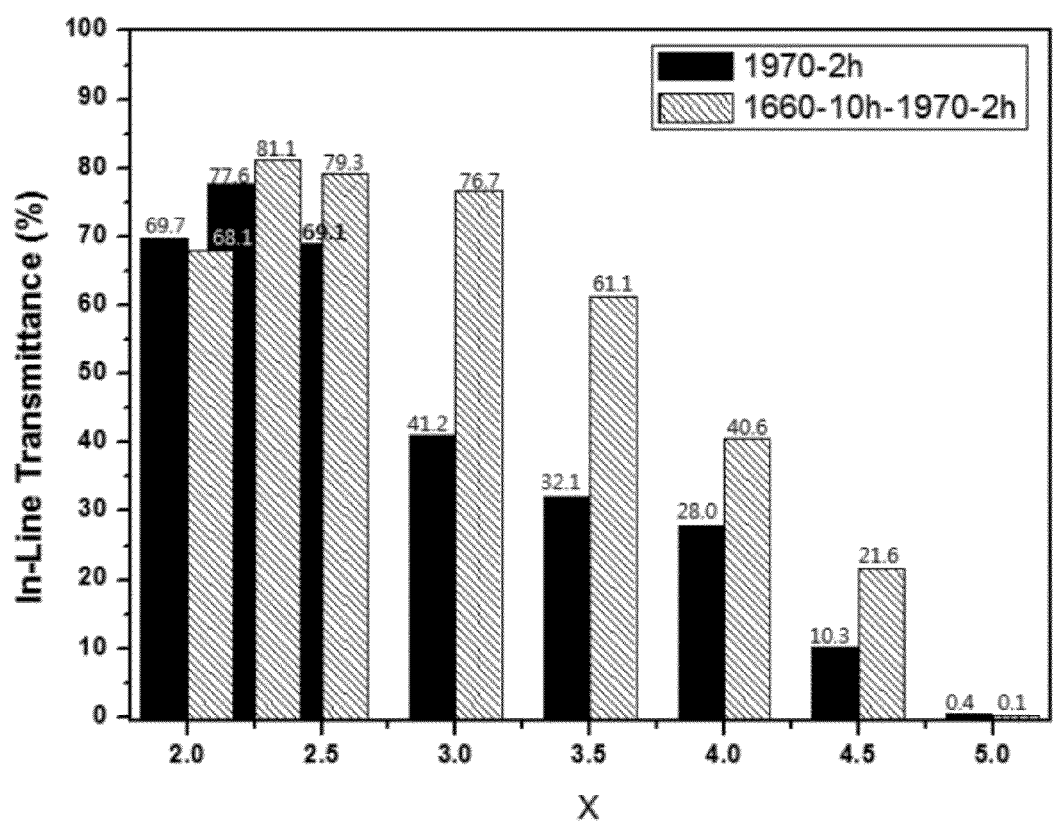
FIG. 2 is a graph for comparing visible-light transmittances according to x values of AlON ceramic specimens on which second sintering is performed without first sintering and of AlON ceramic specimens on which first sintering and second sintering are performed.

FIG. 2 is a graph for comparing in-line transmittances of a light having a wavelength of 632 nm according to x values, based on whether the first sintering is performed. Transmittances of specimens on which only the second sintering is performed without the first sintering are remarkably low compared to those of specimens on which the first sintering and the second sintering are performed, especially when the x value is high. When the x value is 5.0 (35.7 mol % of AlN), the transmittances of two types of the specimens were less than 0.5%, and as the x value decreases, the transmittances of the two types of specimens remarkably increased and reached the maximum value when the x value was 2.25 (20.0 mol % of AlN). Then, the transmittances decreased when the x value was 2.0. In detail, a highest transmittance equal to or higher than 80% was obtained at the x value of 2.25 when the first sintering is performed, and the transmittance was slightly lower, but still near 80% when the x value was 2.5. On the contrary, when 35.7 mol % (x value of 5.0) or 30 mol % (x value of 3.9) of AlN composition that is generally used in a conventional technology is used, a transmittance less than 0.5% or equal to about 45% is obtained.

Figure 3:
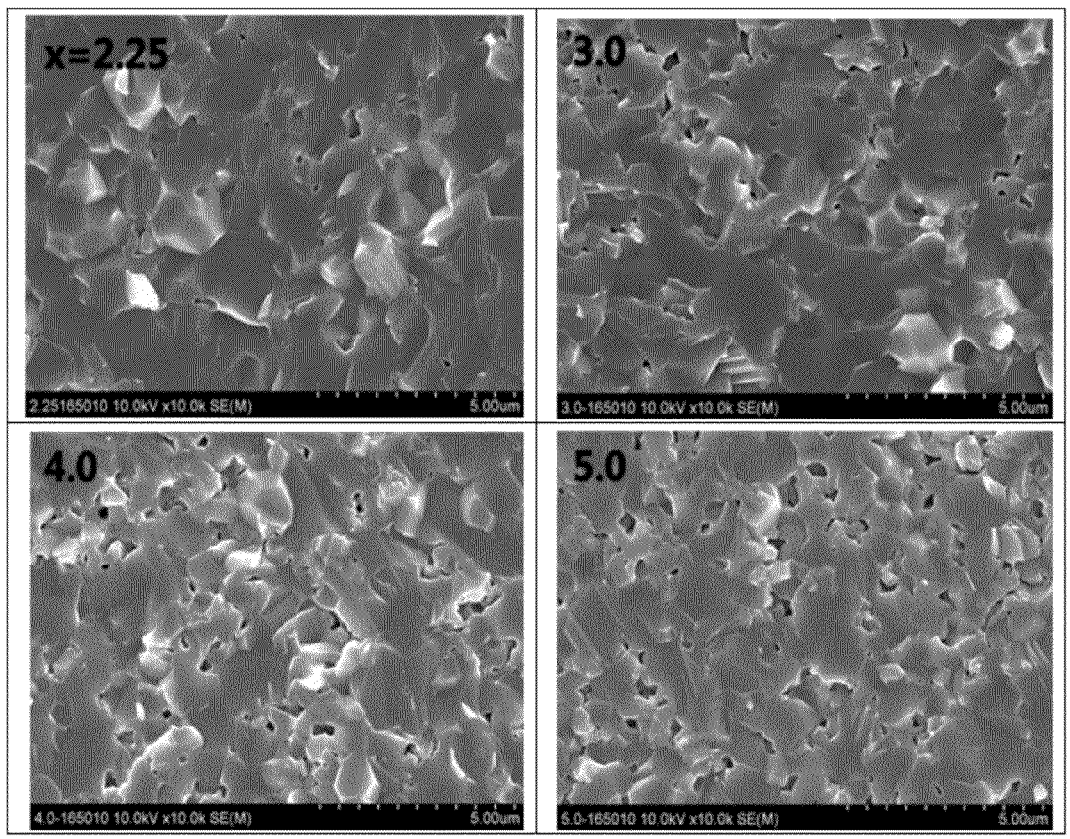
FIG. 3 is scanning electron microscopic (SEM) images (magnification: 10,000 times) of fracture surfaces of specimens whose x values are different and on which only first sintering is performed.

FIG. 3 is scanning electron microscopic (SEM) images of fracture surfaces of specimens on which only first sintering is performed. Here, when an x value is low, i.e., when the content of AlN is low, the number and sizes of pores are small after the first sintering because in a powder mixture of $Al_2O_3$ and AlN, sinterability of the powder mixture is decreased when the content of AlN is increased. Also, AlON is generated when a temperature of the first sintering is 1650° C., and after 10 hours at 1650° C., a volume ratio is from 6 to 10%, and thus $Al_2O_3$ and AlN are reduced. More AlON phases are generated during the first sintering when there is more AlN, and since densification is interrupted during the first sintering like AlN, when an x value is high, i.e., when the content of AlN is high, sinterability of the powder mixture of $Al_2O_3$ and AlN is still low during the first sintering. Also, when the temperature of the first sintering is higher than 1675° C., AlON phases generated during sintering is remarkably increased, and thus densification is difficult. Thus, transparency after the second sintering is low.

Figure 4:
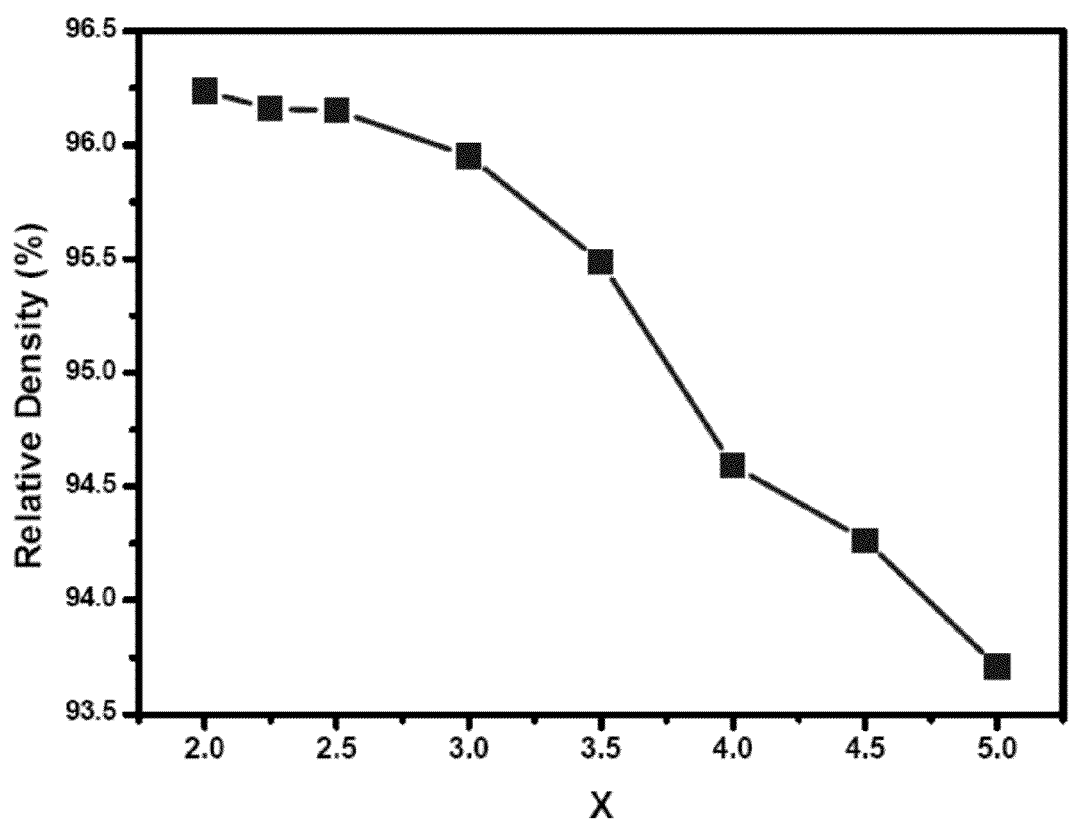
FIG. 4 is a graph showing a relative density according to x values of an AlON specimen on which first sintering is performed for 10 hours at 1660° C.

FIG. 4 is a graph showing a relative density according to x values of AlON specimens on which first sintering is performed like the specimens of FIG. 2. Here, the relative density is remarkably decreased when the x value is higher than 2.5, and the density of the first sintering affects the density or porosity of the second sintering. As shown in FIG. 2, the transmittance is highest when the x value is 2.25 to 2.5 because as described above, the AlON specimens have high density, i.e., low porosity and small pores, during the first sintering, and such small pores are mostly removed during the second sintering. On the other hand, when the x value is equal to or higher than 3.0, in detail, 3.5, large pores having high porosity after the first sintering are not mostly removed during the second sintering.

Figure 5:
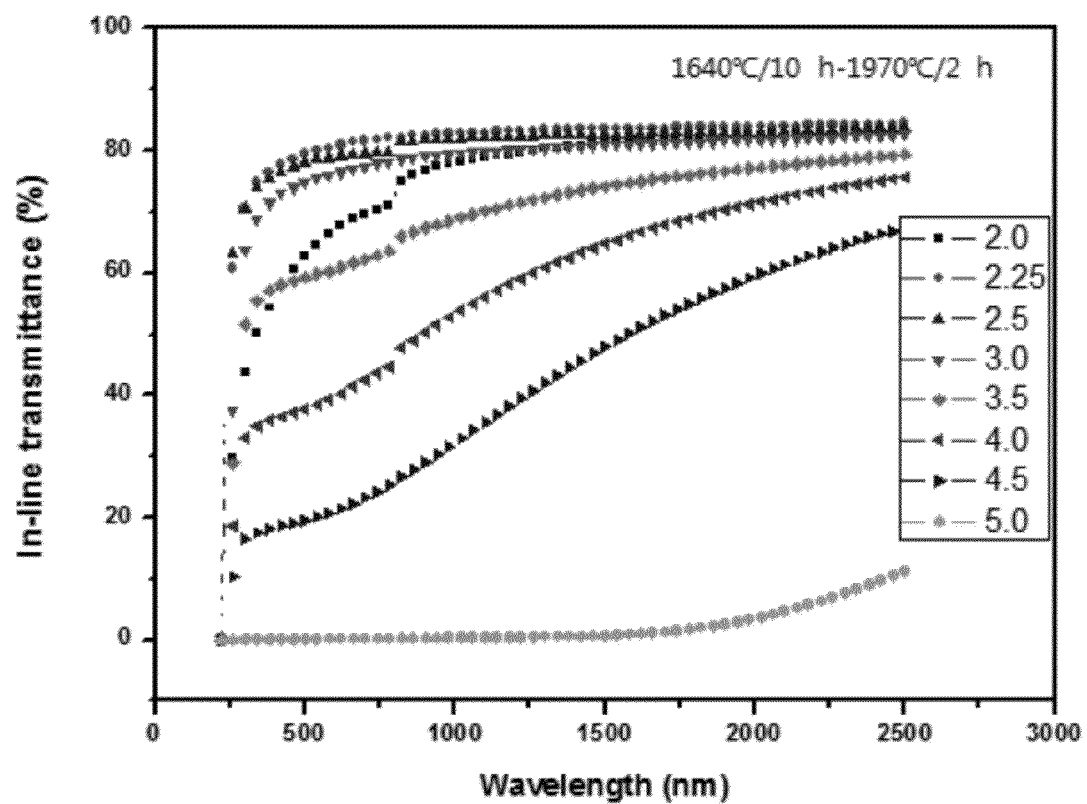
FIG. 5 illustrates spectra of in-line transmittances throughout a region from 200 to 2500 nm according to x values of AlON specimens on which first sintering and second sintering are performed.

FIG. 5 shows in-line transmittances in a wavelength range from 200 to 2500 nm of AlON specimens whose x values are different and on which first sintering and second sintering are performed. When the x value is 2.25 or 2.5, the in-line transmittance was high, i.e., around 80%, in an entire region of a wavelength of a visible light. In detail, when the x value is higher than 2.5, a visible-light transmittance is low, and when the x value is higher than 3.5, the visible-light transmittance is remarkably low.

Figure 6:
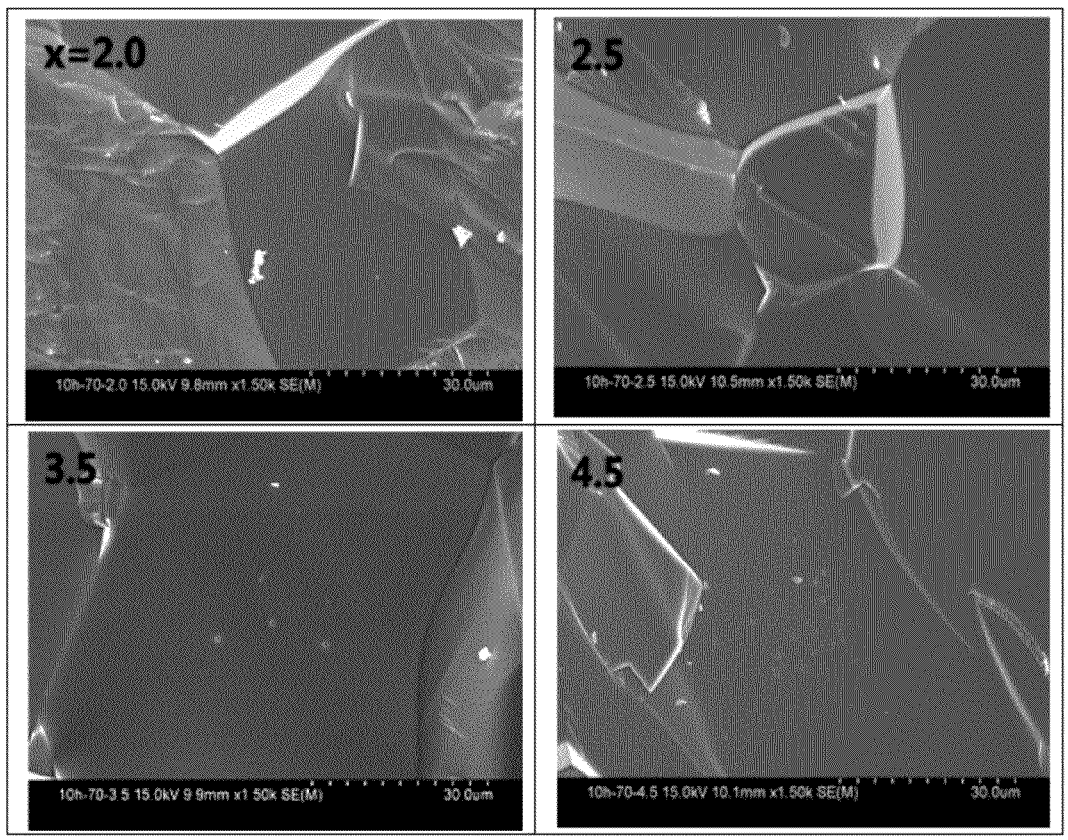
FIG. 6 is SEM images (magnification: 1,500 times) of fracture surfaces of AlON specimens on which first sintering and second sintering are performed.

FIG. 6 is SEM images of fracture surfaces of AlON specimens on which first sintering and second sintering are performed. When an x value is 2.0 as in the left SEM image, fracture surfaces of crystal grains are rough since $\phi'$-AlON phases that are secondary phases are generated when the x value is lower than or equal to 2.25. Such secondary phases are seen even from an X-ray diffraction pattern, and cause the transmittance to decrease when the x value is 2.0 in FIG. 3. The secondary phases are slightly found when the x value is 2.25, but since sinterability is higher than when the x value is 2.5, a light transmittance is the highest when the x value is 2.25. When the x value is lower than or equal to 2.5, it is difficult to find pores in the AlON specimens, and when the x value is equal to or higher than 3.0, micropores are found in the crystal grains. When the x value increases, the number of pores is increased and the transmittance is remarkably decreased. The micropores in the crystal grains are generated as large pores generated after the first sintering due to the large content of AlN whose sinterability is low are not removed during the second sintering and enter the crystal grains.

Example 2

Specimens on which only the first sintering is performed were prepared in the same manner as in Example 1, except that a temperature was varied from 1600° C. to 1725° C.

Figure 7:
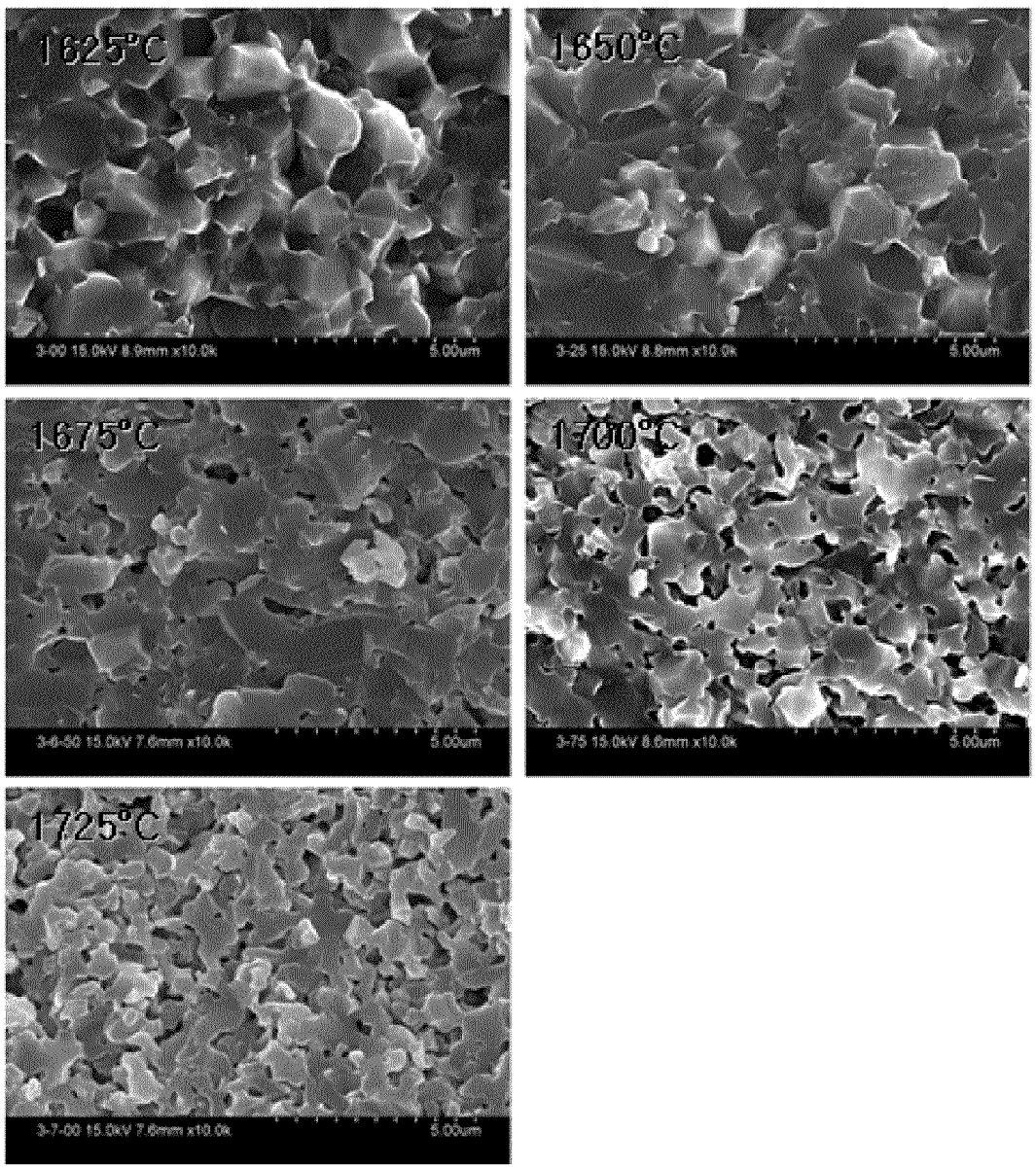
FIG. 7 is SEM images (magnification: 10,000 times) of fracture surfaces of specimens whose x value is fixed to 2.5 and on which only first sintering is performed for 10 hours while varying a temperature from 1625° C. to 1725° C.

FIG. 7 is SEM images of fracture surfaces of specimens, wherein a temperature is varied from 1625° C. to 1725° C. After performing the first sintering for 10 hours, the density of the specimens is the highest at 1650° C. and the porosity of the specimens is remarkably high at 1675° C. or higher because $Al_2O_3$ and AlN react with each other to change into AlON, and AlON is slowly sintered at that temperature.

Figure 8:
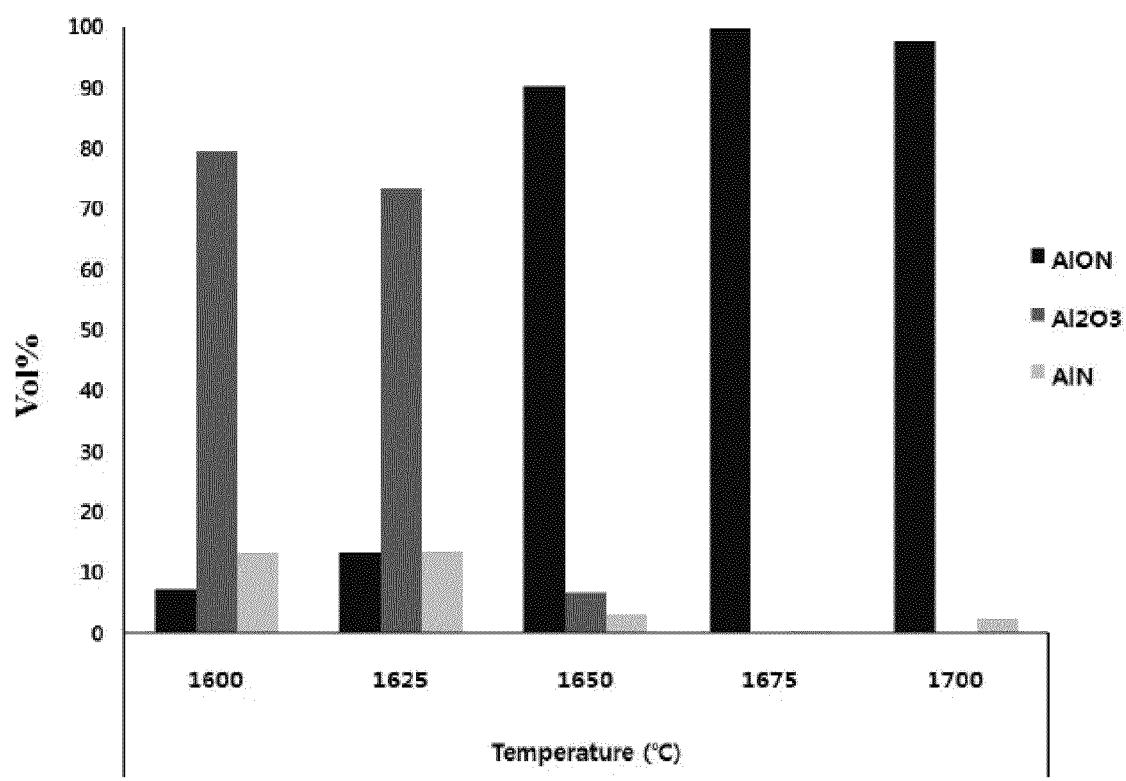
FIG. 8 is a graph of volume fractions on AlON, $Al_2O_3$, and AlN, as results of a quantitative analysis in X-ray diffraction patterns of specimens whose x value is fixed to 2.5 and on which only first sintering is performed for 10 hours while varying a temperature from 1600° C. to 1725° C.

FIG. 8 is a graph of volume fractions on AlON, $Al_2O_3$, and AlN, as results of a quantitative analysis in X-ray diffraction patterns of specimens on which only first sintering is performed while varying a temperature from 1600° C. to 1725° C. An AlON phase is a main phase after 10 hours at 1650° C., and densification and phase change both occur at this temperature, and the densification is assumed to be completed when a relatively high amount of $Al_2O_3$ is left. At 1675° C., the phase change is completed and only the AlON phase is left. In this case, the phase change occurs too quickly before the densification, and thus the densification is not satisfactorily performed and too many pores are left as shown in FIG. 7. Thus, it is important to increase the relative density, i.e., remove the pores, during the first sintering, before the phase is changed too much, i.e., when there are many $Al_2O_3$ left. When the temperature is between 1600° C. and 1625° C., the $Al_2O_3$ phase is mostly left even after 10 hours, but due to the low temperature, sintering may be relatively slow. Thus, the first sintering is performed for a relatively long time to remove the pores at this temperature.

Example 3

AlON ceramic specimens were prepared in the same manner as in Example 1, except that a temperature of first sintering was 1640° C., a duration was varied from 1 to 10 hours, and both MgO and $Y_2O_3$ or only $Y_2O_3$ was added as a sintering additive.

Figure 9:
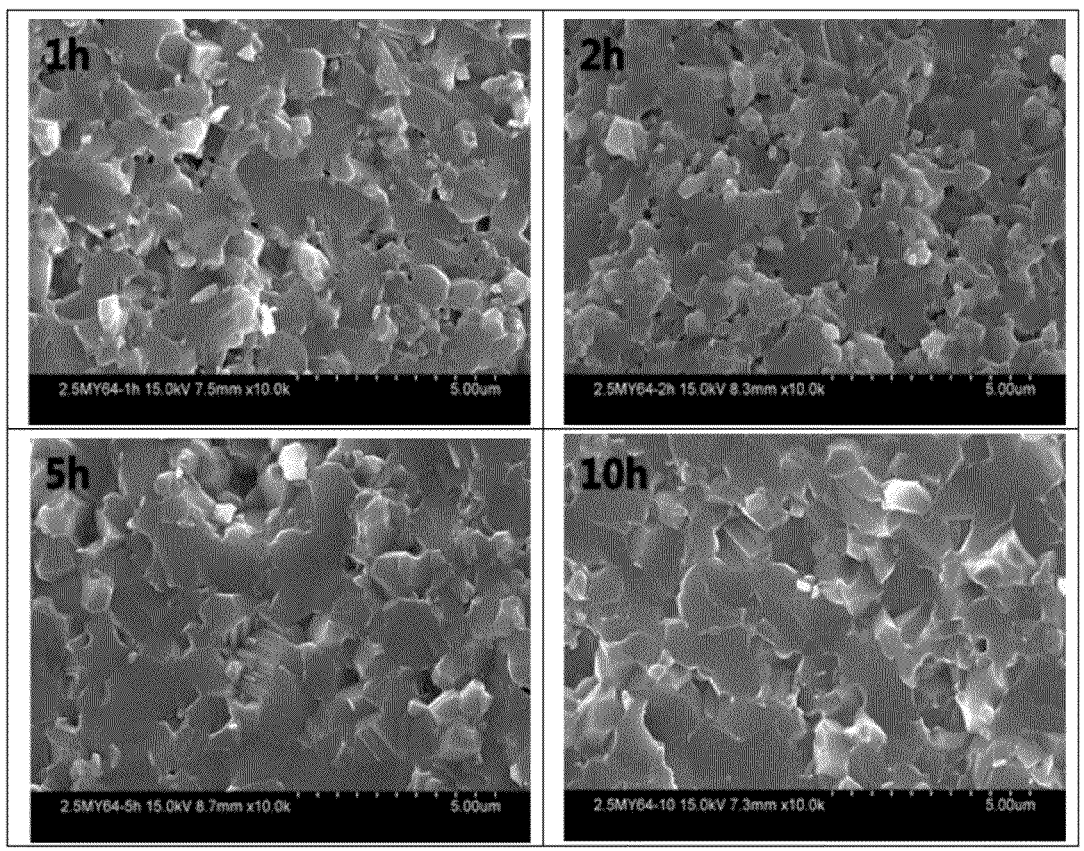
FIG. 9 is SEM images of minute structures of fracture surfaces after first sintering, which are changed as duration of the first sintering is varied from 1 hour to 10 hours when an x value is 2.5.

FIG. 9 is SEM images of minute structures of fracture surfaces after first sintering, which are changed as duration of the first sintering is varied from 1 hour to 10 hours when an x value is 2.5 and both MgO and $Y_2O_3$ are added. When the duration was short, porosity was high, and a relative density continuously increased up to 10 hours. Accordingly, in order to obtain a high relative density 10 hours need to be maintained at the temperature of the first sintering.

Figure 10:
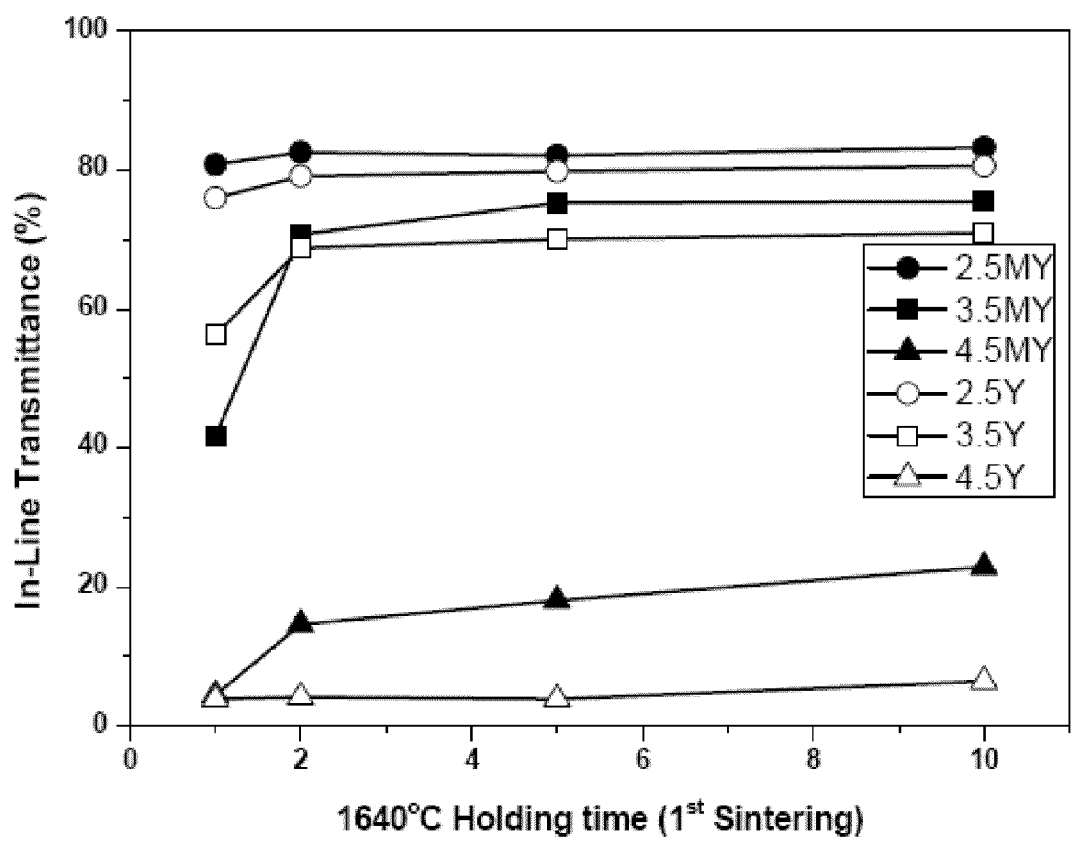
FIG. 10 is a graph showing a visible-light transmittance according to duration of first sintering, based on an x value and based on whether magnesium oxide (MgO) is added as a sintering additive.

FIG. 10 is a graph showing an in-line transmittance of a light having a wavelength of 632 nm, which changes according to duration of first sintering, based on an x value and based on whether MgO is added as a sintering additive. Specimens including MgO and $Y_2O_3$ always had transmittances higher than specimens only including $Y_2O_3$, and the transmittances of the specimens only including $Y_2O_3$ were remarkably increased like the specimens including MgO and $Y_2O_3$ when the x value decreases from 4.5 to 2.5. Also, when the duration of the first sintering was 2 hours, the transmittance was 80.8% when the x value was 2.5, and when the duration of the first sintering slowly increases up to 10 hours, the transmittance was 83.3% after the second sintering of 2 hours at 1970° C. This shows that when the x value is the same, the transmittance is higher if the relative density is high after the first sintering. Thus, even when the x value is 2.5, vacancies in AlON are massive during the second sintering and thus sinterability is increased, but if density after the first sintering is not sufficiently high, i.e., if porosity is high, it is difficult to completely remove pores during the second sintering. Accordingly, since the x value is low, i.e., 2.5 (21.7 mol % of AlN) and the content of $Al_2O_3$ is high during the first sintering, the sinterability is high, and when the relative density is high after the first sintering, a high light transmittance may be obtained.

Example 4

AlON ceramic specimens on which first sintering and second sintering are performed were prepared in the same manner as in Example 1, except that the first sintering was performed for 10 hours at 1650° C., an x value was fixed to 2.5, 0.08 wt % of $Y_2O_3$ was added as a sintering additive while the content of MgO as another sintering additive was varied from 0 to 0.5 wt %.

Figure 11:
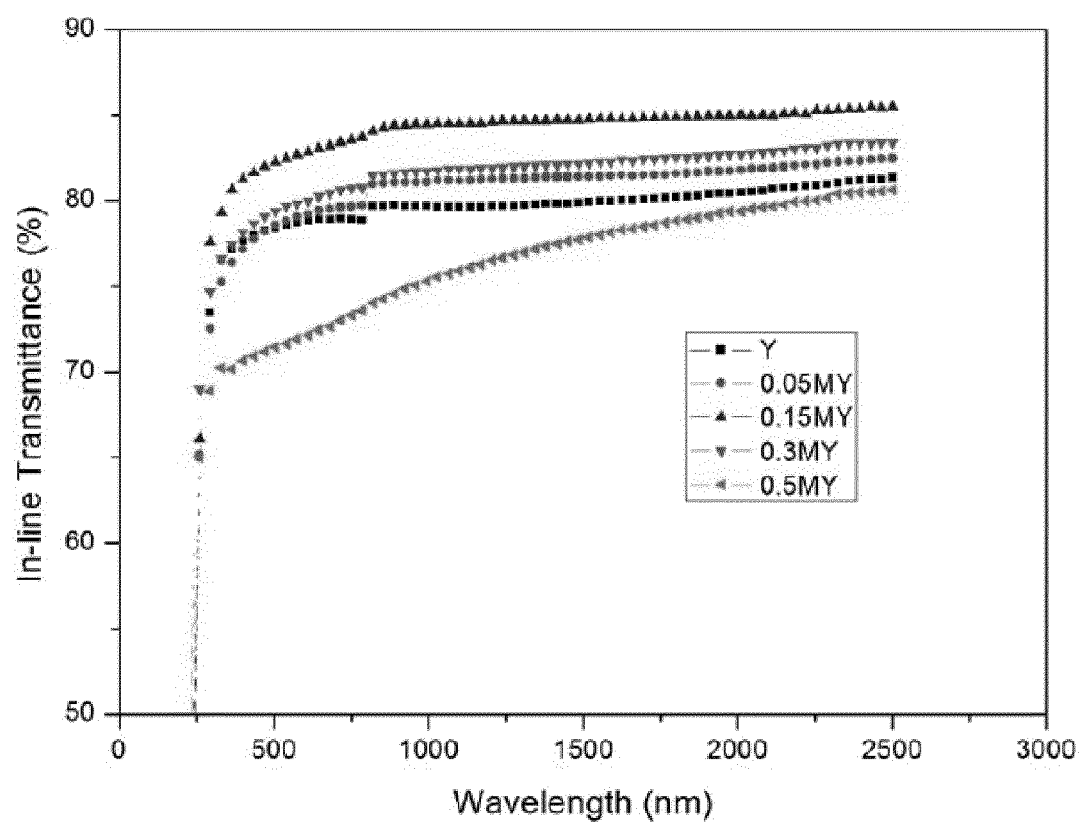
FIG. 11 is a graph of an in-line transmittance in a wavelength range from 200 to 2500 nm, which varies according to the content of MgO as a sintering additive.
Figure 12:
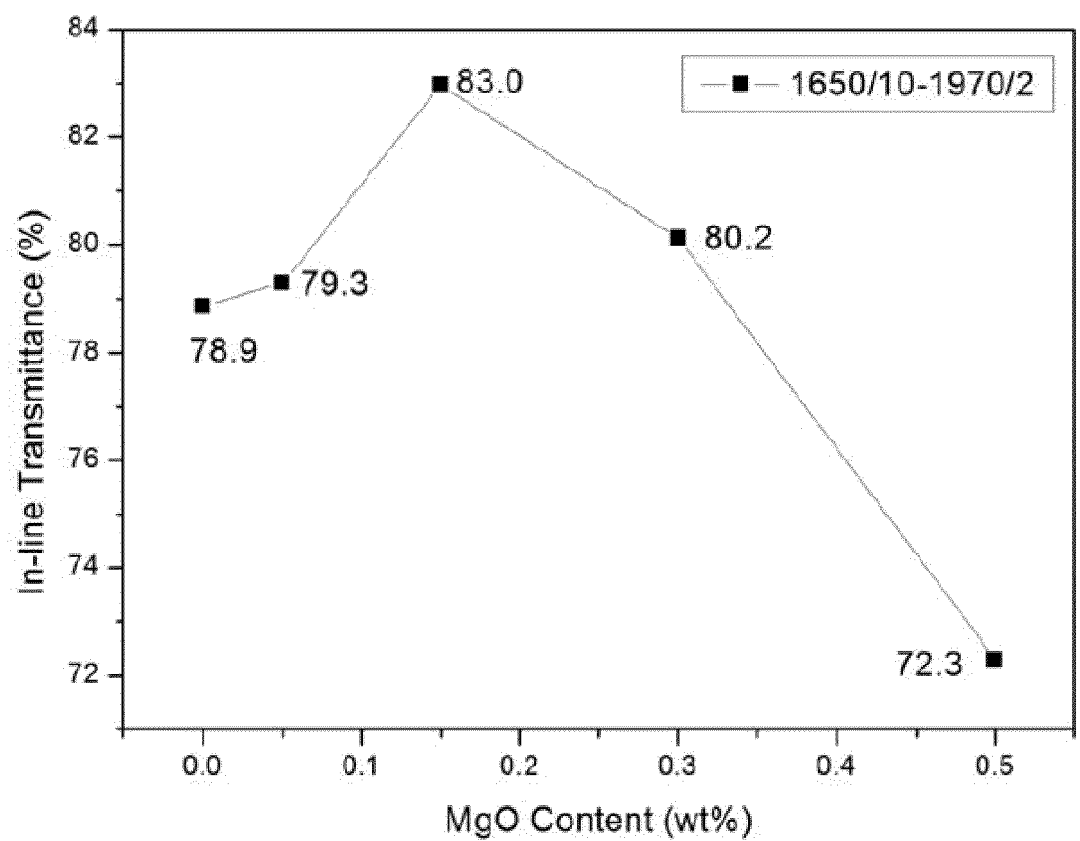
FIG. 12 is a graph of an in-line transmittance of a light having a wavelength of 632 nm according to the content of MgO as a sintering additive.

FIG. 11 is a graph of an in-line transmittance in a wavelength range from 200 to 2500 nm, which varies according to the content of MgO as the sintering additive. Also, FIG. 12 is a graph of an in-line transmittance according to the content of MgO. The in-line transmittance of a specimen that does not include MgO was 78.9%. When 0.05 wt % of MgO was added, the in-line transmittance was slightly increased up to 79.3%, and when 0.15 wt % of MgO was added, the in-line transmittance was highest, i.e., 83.0%. Meanwhile, when the content of MgO was 0.3 wt %, the in-line transmittance was remarkably low, and when the content of MgO was 0.5 wt %, the in-line transmittance was lower than that of a specimen that does not include MgO. According to an X-ray diffraction analysis or minute structure observation, a secondary phase, such as Mg-spinel, was not precipitated by adding a small amount of MgO, for example, at least up to 0.3 wt % of MgO. A limitation of employing Mg with respect to AlON is known to be 4000 ppm at 1870° C. (Solubility Limits of La and Yin Aluminum Oxynitride at 1870° C., J. Am. Ceram. Soc., 91 [5] (2008)), and such a limitation may not be applied from 0.5 wt % of MgO. Such an effect of MgO is shown only in the limitation of employing Mg with respect to AlON, and when a secondary phase is precipitated outside the limitation, sinterability or transmittance may be generally decreased. A function of MgO in sintering of AlON within the limitation may be similar to an effect of MgO that enables pores from being continuously removed by blocking the growth of abnormal crystal grains at the last stage of sintering $Al_2O_3$. Accordingly, it is assumed that by adding MgO, the pores may be continuously removed when the crystal grains are quickly grown during the second sintering, i.e., on the AlON phase whose relative density exceeds 95%. Nevertheless, it is a peculiar phenomenon that the transmittance is highest when MgO is 0.15 wt %, but is decreased when MgO is 3.0% or higher despite that the MgO is within the limitation. Also, as described above, WO 2008-047955 discloses the effect of MgO when the content of AlN is fixed to 35 mol %, and it is an interesting fact that in the present invention, the transmittance is increased in the same manner even when the mole ratio of AlN is much lower.

Example 5

AlON ceramic specimens on which first sintering is performed were prepared in the same manner as in Example 1, except that second sintering was performed for 5 hours at 1970° C.

Figure 13:
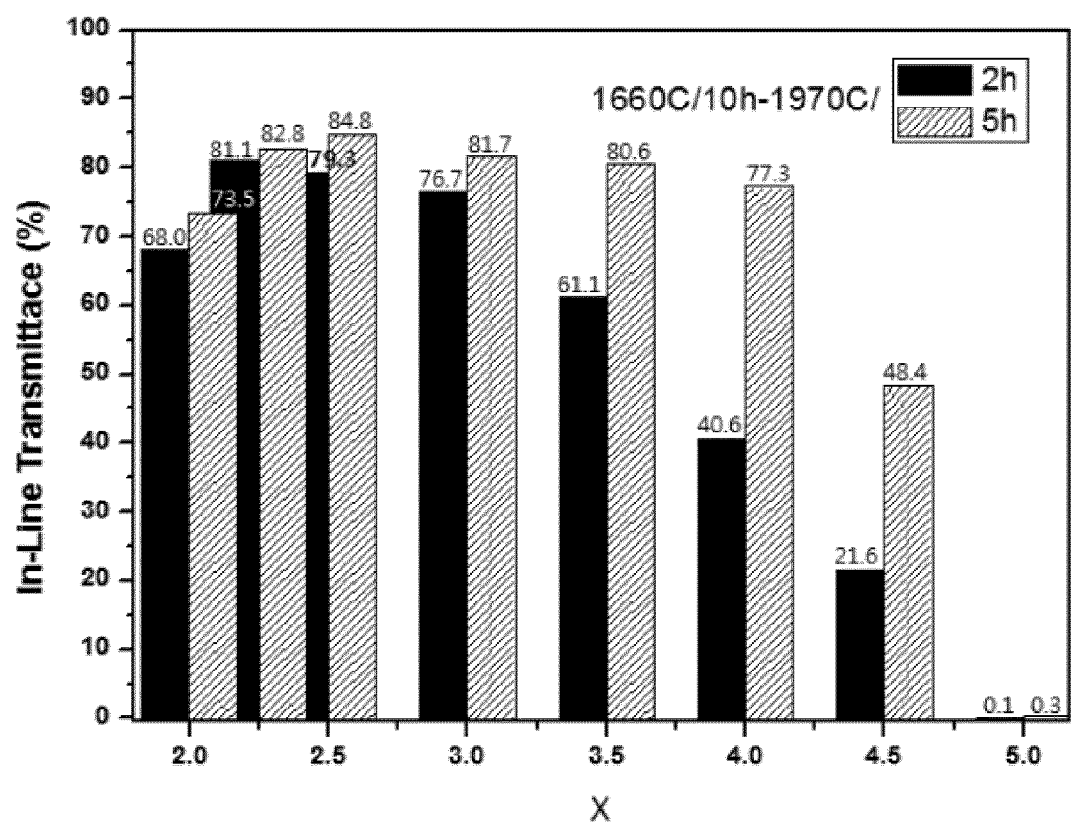
FIG. 13 is a graph for comparing visible-light transmittances of AlON specimens on which first sintering and second sintering are performed and whose second sintering times are 2 hours and 5 hours.

FIG. 13 is a graph for comparing in-line transmittances of a light having a wavelength of 632 nm in the AlON specimens prepared as such according to x values, and in-line transmittances of the specimens of FIG. 2 on which first sintering and second sintering are performed but duration of the second sintering is short, i.e., 2 hours. When the duration of the second sintering is increased, not only pores are further reduced or removed, but also crystal grains are further grown, and thus light scattering in a crystal grain system is reduced and transmittance is increased. Accordingly, the specimens of 5 hours have overall higher transmittances than the specimens of 2 hours. Also, since transmittances show the same tendencies according to x values, transmittances were highest when x values were 2.25 and 2.5. However, when duration of final sintering was 5 hours, the transmittance was higher when the x value was 2.5 than that when the x value was 2.25 because more $\phi'$-AlON secondary phases are generated when the x value is 2.25.

As such, the in-line transmittance of the light having the wavelength of 632 nm was highest, i.e., 84.9% when the x value was 2.5, via sintering of 5 hours at 1970° C. that is a relatively low final sintering temperature. Considering surface reflection of AlON according to a refractive index, such an in-line transmittance corresponds to a theoretical in-line transmittance equal to or higher than 99% that is near a transmittance of single crystal sapphire.

Figure 14:
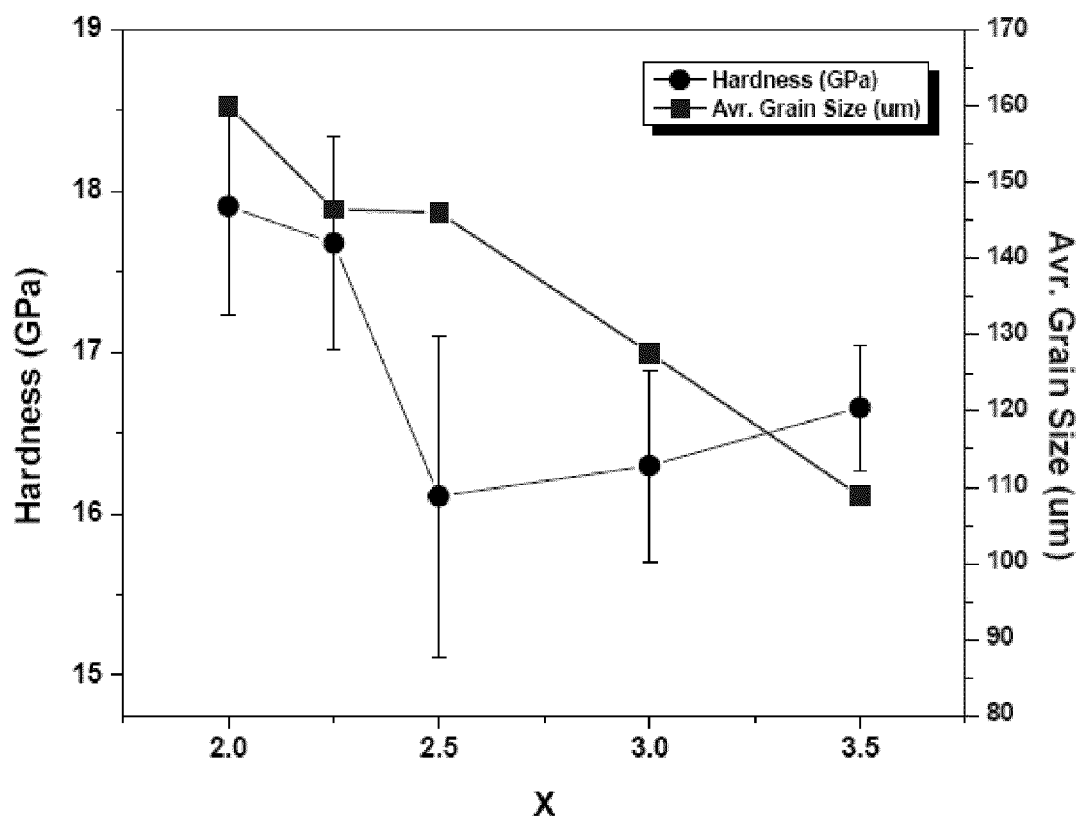
FIG. 14 is a graph showing sizes of crystal grains and Vickers hardnesses of AlON specimens according to x values.

FIG. 14 is a graph showing average sizes of crystal grains and Vickers hardnesses of such AlON specimens measured in a weight of 2.94 N. When the x value increased, sizes of the crystal grains were decreased according to an effect of relatively a large number of pores during sintering. When the x value was 2.5, the Vickers hardness was 16.1 GPa that is similar to a known Vickers hardness of AlON. However, when the x value decreased to 2.25, the Vickers hardness was remarkably increased to 17.7 GPa, and when the x value was 2.0, the Vickers hardness was increased to 17.0 GPa. It is assumed that the Vickers hardness increases due to $\phi'$-AlON secondary phases generated from when the x value is 2.25. The Vickers hardness somewhat increases even when the x value is higher than 2.5, but it is assumed that the Vickers hardness increases since the sizes of the crystal grains are decreased. Also, transparency may be remarkably decreased according to a final sintering temperature and time. $\phi'$-AlON secondary phases also decrease the transparency, but increase the Vickers hardness, and thus when the x value is very low, i.e., 2.25, AlON may turn into transparent ceramic having a transparency equal to or higher than 81%, and high Vickers hardness or high wear-resistance. In detail, the Vickers hardness is increased as the $\phi'$-AlON secondary phases are generated when the powder mixture of $Al_2O_3$ and AlN is sintered, when synthesized AlON powder is sintered, or when the x value is about 2.25, regardless of a method of preparing AlON.

Example 6

AlON ceramic specimens on which first sintering and second sintering are performed were prepared in the same manner as in Example 1, except that the first sintering was performed at 1650° C. for 10 hours, the second sintering was performed at 1950° C. for 7 or 20 hours, and an x value was fixed to 2.5 while varying a thickness of a specimen from 0.75 mm to 5 mm.

Figure 15:
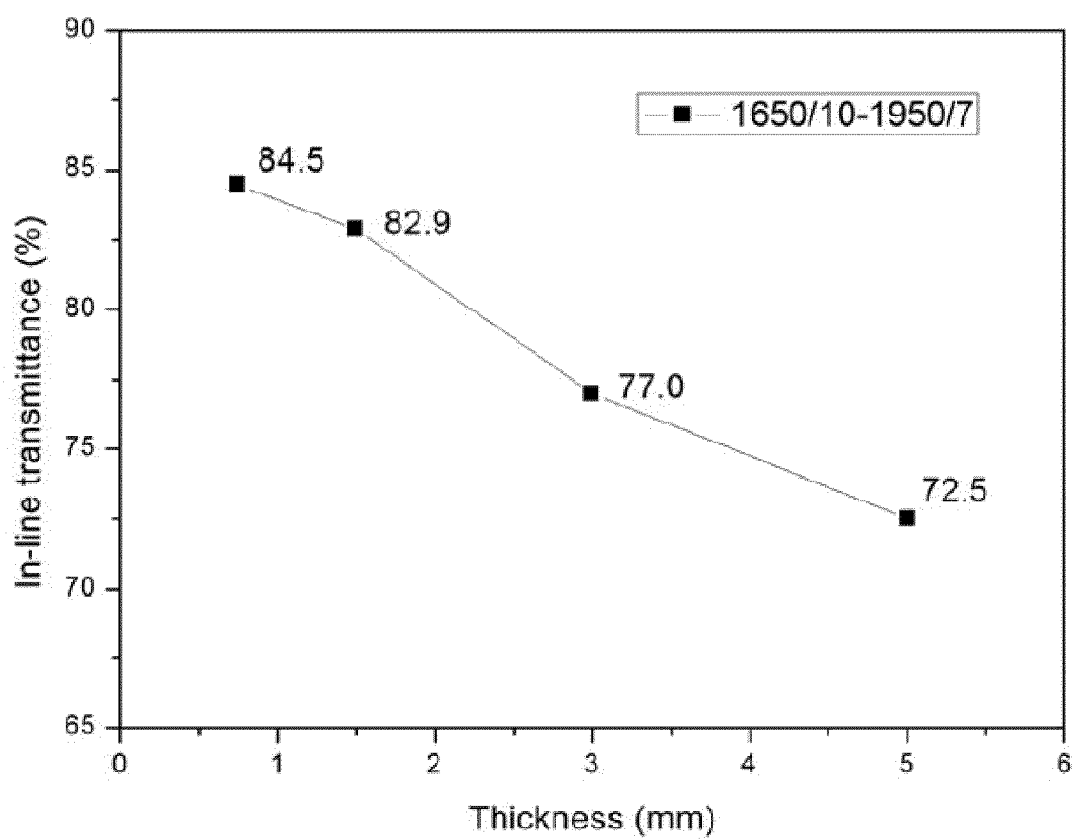
FIG. 15 is a graph showing an in-line transmittance of a light having a wavelength of 632 nm according to thicknesses of a specimen.

FIG. 15 is a graph showing an in-line transmittance of a light having a wavelength of 632 nm according to thicknesses of a specimen from 0.75 mm to 5 mm. Here, when the thickness is thin, the in-line transmittance is high. Despite that sintering was performed for 7 hours at a relatively low temperature of 1950° C., the transmittance exceeds 80% up to the thickness of about 2 mm. However, when the thickness was increased, the transmittance remarkably decreased below 80%, and thus a final sintering temperature or sintering time may be increased in order to obtain a high transmittance or to apply a thick thickness. When the thickness is increased, the number of pores where a light is scattered is increased, and the increased number of polycrystalline grain boundaries where the light is scarred mainly causes the transmittance to decrease. The transmittance is increased when the final sintering temperature or the sintering time is increased, and at this time, the number of pores is decreased, but the number of pores is decreased because the number of grain boundaries is decreased according to the growth of crystal grains.

However, as shown in the minute structures of the fracture surfaces of FIG. 6, when the x value is equal to or higher than 3.5 (29 mol % of AlN), the micropores exist in the crystal grains, and it is difficult to remove pores farther from grain boundaries despite of continuous sintering. In other words, when the x value is high, it is limited to enhance the transmittance by increasing the final sintering temperature or sintering time. Accordingly, a sufficiently low x value is definitely important in obtaining a high transmittance, and as described above, in order to prepare transparent AlON by sintering the powder mixture of $Al_2O_3$ and AlN, first sintering may be sufficiently performed at a temperature around 1650° C. In addition, it is important to add 0.15 wt % of MgO within a relatively narrow range in order to obtain a high transmittance.

The first sintering is performed to prepare transparent AlON by sintering the powder mixture of $Al_2O_3$ and AlN, and the small x value around 2.5 may be helpful not only in sintering the powder mixture of $Al_2O_3$ and AlN, but also in sintering AlON powder after synthesizing the AlON powder. When sintering is performed without the first sintering, a temperature quickly increases by 600° C. per hour, and thus an AlON phase including many pores without being densified is formed, and a sintering temperature increases up to 1900° C. This is similar to preparing an AlON specimen without an effect of the first sintering. FIG. 2 shows the light transmittances of the specimens that are prepared without the first sintering according to the x values. In other words, the transmittance of the AlON phase obtained via sintering is similar to that when the first sintering and then the second sintering are performed on the powder mixture of $Al_2O_3$ and AlN having the relative density of about 95%. When the x value was decreased to 2.5, the transmittance remarkably increased, and when the x value was increased to 5.0, the transmittance remarkably decreased. Accordingly, even when AlON powder having a low x value is synthesized and the sintered, the sinterability or densification is increased like when the powder mixture of $Al_2O_3$ and AlN is sintered. Thus, the pores may be easily removed, and as a result, the transmittance may be remarkably increased.

As described above, when AlON is prepared by sintering the powder mixture of $Al_2O_3$ and AlN, the x value increases the densification of the powder mixture during the first sintering and increases the sinterability during the second sintering according to the increase of vacancies of Al positive ions in AlON as described in detail above. However, when AlON is prepared by synthesizing AlON powder, the x value only increases the sinterability according to the increase of vacancies. However, considering the transmittance obtained without the first sintering shown in FIG. 2 as described above, the sinterability is increased sufficiently high such that the transmittance of AlON prepared by sintering the synthesized AlON powder having a low x value is increased.

Similarly, like the case when a small amount of MgO is added as the sintering additive, the transmittance may be increased when AlON is prepared by sintering the synthesized AlON powder. According to WO 2008-047955, when AlON is prepared by sintering the powder mixture of $Al_2O_3$ and AlN whose AlN composition of a raw material is fixed to 35 mol %, the transmittance of the specimen sintered for 5 hours at 2000° C. without the first sintering dramatically changes according to the content of MgO. In other words, the transmittance largely changed to 0.2%, 3.2% 63.1%, 28.7%, and 2.5% when the content of MgO changed to 0 wt %, 0.05 wt %, 0.1 wt %, 0.2 wt %, and 0.3 wt %. When the content of MgO increases from 0.05 wt % to 0.1 wt %, the transmittance vertically increases from 3.2% that is opaque to 63.1% that is relatively transparent, and when the content of MgO is 0.3 wt %, the transmittance decreased to 2.5%. As shown in FIG. 10, the adding of MgO is effective regardless of the x value, i.e., in all ranges of x values from 2.5 to 4.5. Accordingly, it is easily expected that the increase of the transmittance obtained by only performing the second sintering by adding MgO would be obtained when AlON is prepared by sintering the synthesized AlON powder.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for preparing transparent polycrystalline aluminum oxynitride (AlON) that a powder mixture of aluminum oxide ($Al_2O_3$) and aluminum nitride (AlN) is sintered under an atmospheric pressure, the method comprising:
   performing first sintering at a temperature from 1575° C. to 1675° C. such that a relative density is equal to or higher than 95% and the content of pure AlN is in a range from 17 to 26 mol %; and
   performing second sintering at a temperature from 1900° C. to 2050° C. such that a relative density higher than that in the first sintering is obtained,
   wherein a visible-light transmittance of a specimen having a thickness of 1.5 mm, which is obtained by the second sintering, is equal to or higher than 83%.

2. The method of claim 1, wherein the first sintering and second sintering are performed by adding at least one selected from 0.02 to 0.5 wt % of yttrium oxide ($Y_2O_3$), 0.02 to 0.5 wt % of lanthanum oxide ($La_2O_3$), yttrium (Y) compound corresponding to 0.02 to 0.5 wt % of $Y_2O_3$, or lanthanum (La) compound corresponding to 0.02 to 0.5 wt % of $La_2O_3$, as a sintering additive.

3. The method of claim 2, the first sintering and second sintering are performed by further adding 0.06 to 0.29 wt % of magnesium oxide (MgO) or magnesium (Mg) compound corresponding to 0.06 to 0.29 wt % of MgO, as a sintering additive.

4. The method of claim 1, wherein the content of the pure AlN is from 21 to 23 mol %.

5. A method for preparing transparent polycrystalline aluminum oxynitride (AlON) that a powder mixture of aluminum oxide ($Al_2O_3$) and aluminum nitride (AlN) is sintered, the method comprising:
   performing first sintering under an atmospheric pressure at a temperature from 1575° C. to 1675° C. such that a relative density is equal to or higher than 95% and the content of pure AlN is in a range from 17 to 26 mol %; and
   performing second sintering under an overpressure of 0.1 to 10 MPa by using a nitrogen gas pressure at a temperature from 1900° C. to 2050° C. such that a relative density higher than that in the first sintering is obtained,
   wherein a visible-light transmittance of a specimen having a thickness of 1.5 mm, which is obtained by the second sintering, is equal to or higher than 83%.

6. The method of claim 5, wherein the second sintering is performed under the overpressure of 0.1 to 0.3 MPa by using the nitrogen gas pressure.

7. A method for preparing transparent polycrystalline aluminum oxynitride (AlON) that a powder mixture of aluminum oxide ($Al_2O_3$) and aluminum nitride (AlN) is sintered under an atmospheric pressure, the method comprising:

performing first sintering at a temperature from 1575° C. to 1675° C. for 1-10 hours such that a relative density is equal to or higher than 95% and the content of pure AlN is in a range from 17 to 26 mol %; and performing second sintering at a temperature from 1900° C. to 2050° C. for 2-5 hours such that a relative density higher than that in the first sintering is obtained, wherein the first sintering and second sintering are performed by adding 0.06 to 0.29 wt % of magnesium oxide (MgO) or magnesium (Mg) compound corresponding to 0.06 to 0.29 wt % of MgO, as a sintering additive, wherein a visible-light transmittance of a specimen having a thickness of 1.5 mm, which is obtained by the second sintering, is equal to or higher than 83%.

* * * * *